US012698816B2

(12) United States Patent
Mallin

(10) Patent No.: US 12,698,816 B2
(45) Date of Patent: Aug. 4, 2026

(54) HYDRAULIC DAMPER HAVING A RING

(71) Applicant: ADVANCED SUSPENSION TECHNOLOGY LLC, Northville, MI (US)

(72) Inventor: Thomas Mallin, Temperance, MI (US)

(73) Assignee: Advanced Suspension Technology LLC, Northville, MI (US)

( * ) Notice: Subject to any disclaimer, the term of this patent is extended or adjusted under 35 U.S.C. 154(b) by 400 days.

(21) Appl. No.: 18/232,619

(22) Filed: Aug. 10, 2023

(65) Prior Publication Data

US 2025/0052296 A1 Feb. 13, 2025

(51) Int. Cl.
| | |
|---|---|
| *F16F 9/36* | (2006.01) |
| *B60G 13/08* | (2006.01) |
| *B60G 17/08* | (2006.01) |
| *F16F 9/516* | (2006.01) |
| *F16F 9/18* | (2006.01) |

(52) U.S. Cl.
CPC .............. *F16F 9/36* (2013.01); *F16F 9/516* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2600/21* (2013.01); *B60G 2800/162* (2013.01); *B60G 2800/916* (2013.01); *F16F 9/18* (2013.01); *F16F 2222/12* (2013.01); *F16F 2228/066* (2013.01); *F16F 2230/02* (2013.01); *F16F 2230/30* (2013.01)

(58) Field of Classification Search
CPC .......... F16F 9/36; F16F 9/516; F16F 2222/12; F16F 2228/066; F16F 2230/02; F16F 9/34; F16F 9/5165; B60G 17/08; B60G 2202/24; B60G 2204/62; B60G 2206/41; B60G 2500/104; B60G 2600/21; B60G 2800/162; B60G 2800/916
See application file for complete search history.

(56) References Cited

U.S. PATENT DOCUMENTS

| | | | | |
|---|---|---|---|---|
| 3,575,424 A | * | 4/1971 | Taschenberg | .......... F16J 15/442 277/411 |
| 3,743,303 A | * | 7/1973 | Pope | ...... F16J 15/441 277/928 |
| 5,145,189 A | * | 9/1992 | Pope | ...... F16J 15/441 277/544 |

(Continued)

FOREIGN PATENT DOCUMENTS

| | | |
|---|---|---|
| CN | 208057798 U | 11/2018 |
| JP | WO2018155339 A1 | 8/2018 |

OTHER PUBLICATIONS

International Search Report and the Written Opinion of the International Searching Authority for counterpart PCT/US2024/041509, mailed Dec. 4, 2024, 12 pages.

*Primary Examiner* — Robert A. Siconolfi
*Assistant Examiner* — James K Hsiao
(74) *Attorney, Agent, or Firm* — McGarry Bair PC

(57) ABSTRACT

A hydraulic damper comprising a moveable rod, a collar, and a ring. The moveable rod having a centerline axis. The collar circumscribing and coupled to the moveable rod. The ring axially adjacent the collar and having an inner wall, an outer wall, a first wall, and a second wall. The inner wall circumscribing the moveable rod. The outer wall circumscribing the inner wall. The ring further having a boss provided on the first wall.

20 Claims, 8 Drawing Sheets

(56)　　　　　References Cited

U.S. PATENT DOCUMENTS

| | | | | |
|---|---|---|---|---|
| 5,411,298 | A * | 5/1995 | Pollack | F16L 39/06 |
| | | | | 285/94 |
| 6,679,678 | B2 * | 1/2004 | Giesler | F01D 11/00 |
| | | | | 277/375 |
| 9,593,697 | B2 | 3/2017 | Baalmann et al. | |
| 9,835,220 | B2 * | 12/2017 | Kontny | F16F 9/49 |
| 9,909,638 | B2 * | 3/2018 | Chyla | F16F 13/007 |
| 10,393,210 | B2 * | 8/2019 | Knapczyk | F16F 9/463 |
| 10,393,272 | B2 * | 8/2019 | Mosley | F16J 15/443 |
| 10,533,624 | B2 | 1/2020 | Ishimaru et al. | |
| 10,634,254 | B2 * | 4/2020 | Watanabe | F16J 15/164 |
| 10,989,268 | B2 * | 4/2021 | Oliveira | F16F 9/585 |
| 11,199,262 | B2 * | 12/2021 | Kuroki | F16J 15/30 |
| 11,543,000 | B2 * | 1/2023 | Kontny | F16F 9/49 |
| 11,732,771 | B2 * | 8/2023 | Malec | F16F 9/483 |
| | | | | 188/288 |
| 11,892,056 | B2 * | 2/2024 | Roessle | F16F 9/3405 |
| 12,416,344 | B2 * | 9/2025 | Sarapata | F16F 9/49 |
| 12,460,694 | B2 * | 11/2025 | Roessle | F16F 9/34 |
| 2006/0219507 | A1 * | 10/2006 | Drott | F16J 15/164 |
| | | | | 188/322.16 |
| 2007/0246892 | A1 * | 10/2007 | Andersson | B63H 23/321 |
| | | | | 267/141 |
| 2014/0360353 | A1 * | 12/2014 | Baalmann | F16F 9/49 |
| | | | | 92/143 |
| 2015/0090548 | A1 * | 4/2015 | Yamanaka | F16F 9/3271 |
| | | | | 29/434 |
| 2015/0240948 | A1 | 8/2015 | Watanabe | |
| 2015/0369367 | A1 * | 12/2015 | Kuroki | F16J 15/30 |
| | | | | 277/543 |
| 2017/0009840 | A1 | 1/2017 | Hertz | |
| 2018/0223942 | A1 * | 8/2018 | Kus | F16F 9/165 |
| 2021/0010559 | A1 * | 1/2021 | Oliveira | B60G 13/08 |
| 2022/0341481 | A1 * | 10/2022 | Roessle | F16F 9/3242 |
| 2023/0111439 | A1 | 4/2023 | Roessle | |

* cited by examiner

HYDRAULIC DAMPER HAVING A RING

TECHNICAL FIELD

The disclosure generally relates to a hydraulic damper, specifically a hydraulic damper of a suspension system.

BACKGROUND

A hydraulic damper, and particularly a hydraulic damper of a suspension system, is a damping mechanism that is used to stabilize or otherwise minimize an uncontrolled oscillation of the suspension system. The hydraulic damper can include a tube defining a reservoir containing at least a hydraulic fluid, an oscillating member or moveable rod extending through at least portion of the reservoir, and a valve fluidly coupled to the reservoir. The valve can define a hydraulic fluid channel that can act as an inlet for the hydraulic fluid within the reservoir. The oscillating member, at one end, can be operably coupled to an oscillating, moving, or otherwise non-static portion of the suspension system (e.g., a lever arm coupled to a wheel). The movement of the non-static portion that the oscillating rod is coupled to can cause the movement of the oscillating rod through the reservoir. This, in turn, can direct the hydraulic fluid through valving provided within the hydraulic damper, thus creating a damping effect on the non-static portion of the suspension system.

BRIEF DESCRIPTION

In one aspect a hydraulic damper comprising a moveable rod having a centerline axis, a collar circumscribing and coupled to the moveable rod, and a ring axially adjacent the collar, the ring comprising an inner wall extending circumferentially about the centerline axis and circumscribing the moveable rod, an outer wall extending circumferentially about the centerline axis, the outer wall circumscribing the inner wall, a first wall interconnecting the inner wall and the outer wall at a first end of the ring, the first wall being axially adjacent the collar, a second wall, axially spaced from the first wall, interconnecting the inner wall and the outer wall at a second end, axially opposing the first end, of the ring, and a boss provided along a portion of the first wall and defining a raised portion of the first wall, the boss terminating prior to the inner wall, the boss forming a contact point defining a fluid-tight seal with the collar during a first stroke of the hydraulic damper.

In another aspect a ring for a hydraulic damper having a moveable rod having a centerline axis, the ring comprising an inner wall extending circumferentially about the centerline axis and circumscribing the moveable rod, an outer wall extending circumferentially about the centerline axis, the outer wall circumscribing the inner wall, a first wall interconnecting the inner wall and the outer wall at a first end of the ring, a second wall, axially spaced from the first wall, interconnecting the inner wall and the outer wall at a second end, axially opposing the first end, of the ring, and a boss provided along a portion of the first wall and defining a raised portion of the first wall, the boss terminating prior to the inner wall.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
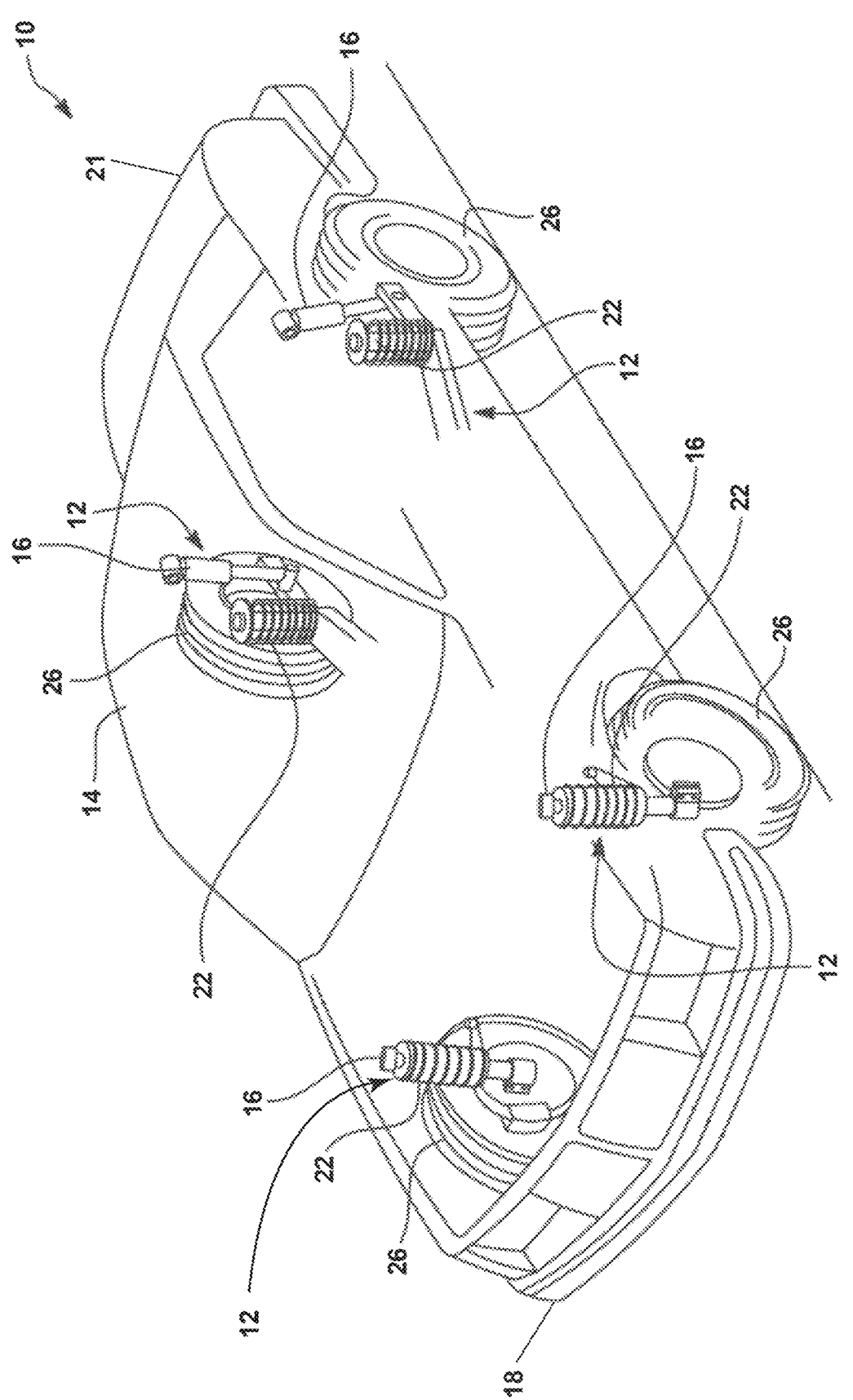
FIG. 1 is a schematic illustration of a vehicle including a set of suspension systems including a set of hydraulic dampers, according to an aspect of the present disclosure.

Aspects of this disclosure described herein are broadly directed to a hydraulic damper including an outer tube, an inner tube or a pressure tube, and a sealing assembly provided within the pressure tube. The sealing assembly includes a collar and a ring. The ring includes with a first wall, a second wall, an inner wall, and a boss. The first wall and the boss confronts the collar. The boss directly contacts the collar. The ring including the boss can be used to limit, control, retard, or otherwise stop the uncontrolled ingress of hydraulic fluid between the high-pressure region and the low-pressure region.

The hydraulic damper can be utilized within any suitable damping mechanism. As a non-limiting example, the hydraulic damper can be utilized within a suspension system for a vehicle. It will be understood, however, that aspects of the disclosure described herein are not so limited and can have general applicability within other assemblies including a hydraulic damper. For example, the disclosure can have applicability for hydraulic damper in other vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic illustration of a vehicle 10 including a body 14, a set of wheels 26, and a set of suspension systems 12 in accordance with the present disclosure. The vehicle 10 can include any number of one or more suspension systems with each suspension system of the set of suspension system corresponding to at least one tire of the set of wheels 26. At least one suspension system of the set of suspension systems 12 can include a hydraulic damper 16. As a non-limiting example, the vehicle 10 can include two rear suspensions systems of the set of suspensions systems 12, with each rear suspension system including a respective hydraulic damper 16. The vehicle 10 can be any suitable vehicle 10. As a non-limiting example, the vehicle 10 can include a vehicle driven by an internal combustion engine, an electric vehicle, or a hybrid vehicle. The vehicle 10 includes a body 14. While the vehicle 10 has been depicted as a passenger car including the set of hydraulic dampers 16, it will be appreciated that the set of hydraulic dampers 16 as describe herein can be used with other types of vehicles or any equipment that requires damping. Examples of vehicles include buses, trucks, off-road vehicles, and so forth. Furthermore, the term "damper" as used herein will refer to dampers in general and will include shock absorbers, MacPherson struts, and semi-active and active suspensions.

The set of suspension systems 12, as a non-limiting example, can include a rear suspension, nearest the rear 21 or trunk, and a front suspension, nearest the front 18 or hood. The rear suspension includes a transversely extending rear axle assembly (not shown) adapted to operatively support a pair of rear wheels of the set of wheels 20. The rear axle assembly is operatively connected to the body 14 through the set of hydraulic dampers 16 and a pair of helical coil springs 22. Similarly, the front suspension includes a transversely extending front axle assembly (not shown) which operatively supports a pair of front wheels of the set of wheels 20. The front axle assembly can be operatively connected to the body 14 through another pair of the set of hydraulic dampers (not illustrated) and a pair of helical coil springs 22. As a non-limiting example, the vehicle 10 can include an independent suspension unit (not shown) for each of the four corners instead of front and rear axle assemblies.

The set of hydraulic dampers 16 of the suspension system 12 serve to dampen relative movement of the unsprung portion (i.e., the front and rear suspensions) and the sprung portion (i.e., the body 14) of the vehicle 10.

Figure 2:
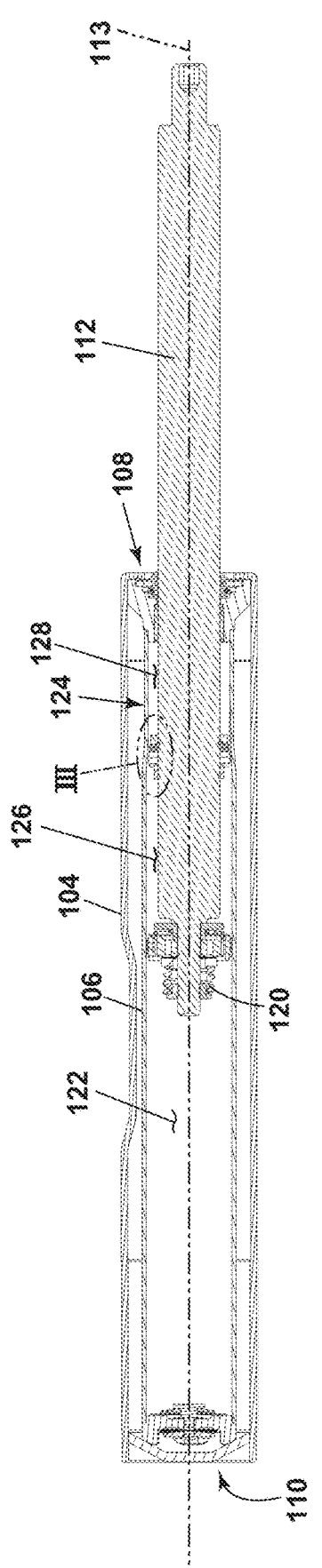
FIG. 2 is a schematic cross-sectional view of a hydraulic damper suitable for use as the hydraulic damper of FIG. 1, the hydraulic damper including a sealing assembly and a moveable rod.

FIG. 2 schematically illustrates a cross-sectional view of a hydraulic damper 100 suitable for use as the hydraulic damper 16 of FIG. 1. It will be appreciated that the hydraulic damper 100 can be any suitable hydraulic damper 100 for the vehicle 10 (FIG. 1) or any other vehicle or implementation of a hydraulic damper. As a non-limiting example, the hydraulic damper 100 can include a Continuously Variable Semi-Active Suspension system (CVSA) damper or a shock absorber. As illustrated, the hydraulic damper 100 is a double-tube damper. Alternatively, the hydraulic damper 100 can include a mono-tube damper.

The hydraulic damper 100 includes an outer tube 104 and an inner tube or pressure tube 106. The outer tube 104 extends between a first end 108 and a second end 110 opposite to the first end 108. The pressure tube 106 can be formed as a monolithic pressure tube. The pressure tube 106 can be further formed as a substantially cylindrical tube with open ends.

A moveable rod 112 can be slidably disposed within the pressure tube 106. The moveable rod 112 can include an end stop 120 provided at a distal end of the moveable rod 112. The end stop 120 can create a fluid tight or a fluid restricting seal between the pressure tube 106 and the moveable rod 112. As such, the end stop 120 can split the pressure tube 106 into a plurality of chambers; a compression chamber 122 and a rebound chamber 124. The compression chamber 122 can be provided between the end stop 120 and the second end 110, while the rebound chamber 124 can be formed between the end stop 120 and the first end 108.

A sealing assembly can be provided within the rebound chamber 124 and split the rebound chamber 124 into a first rebound chamber 126 and a second rebound chamber 128. The first rebound chamber 126 is provided between the end stop 120 and the sealing assembly, while the second rebound chamber 128 is provided between the sealing assembly and the first end 108.

The moveable rod 112 can be connected to the body 14 of the vehicle 10 by a moveable rod 112. The moveable rod 112 is moveable within the hydraulic damper 100 along a centerline axis 113. The moveable rod 112 is partially received within the pressure tube 106. The moveable rod 112 extends through the first end 108 of the pressure tube 106.

The hydraulic damper 100 can include any other suitable component not described or illustrated. As a non-limiting example, the hydraulic damper 100 can include a valve assembly (not illustrated) that provides fluid communication between a reserve chamber (e.g., the compression chamber 122) and an external fluid reservoir. In such examples, the valve assembly can regulate a flow of fluid between the compression chamber 122 and the external fluid reservoir. The valve assembly can be electronically controlled by an electronic controller (e.g. the electronic controller 24 of FIG. 1).

During operation of the hydraulic damper 100, a hydraulic fluid can move within and/or between the compression chamber 122, the first rebound chamber 126 and the second rebound chamber 128. The sealing assembly can limit, seal against, restrict or otherwise retard a flow of hydraulic fluid between the first rebound chamber 126 and the second rebound chamber 128.

Figure 3:
FIG. 3 is a schematic enlarged, cross-sectional view of the sealing assembly as seen from portion III of FIG. 2, further illustrating a first collar, a second collar, and a ring disposed therebetween, the ring having a first wall, a second wall, an inner wall and an outer wall.
Figure 3:
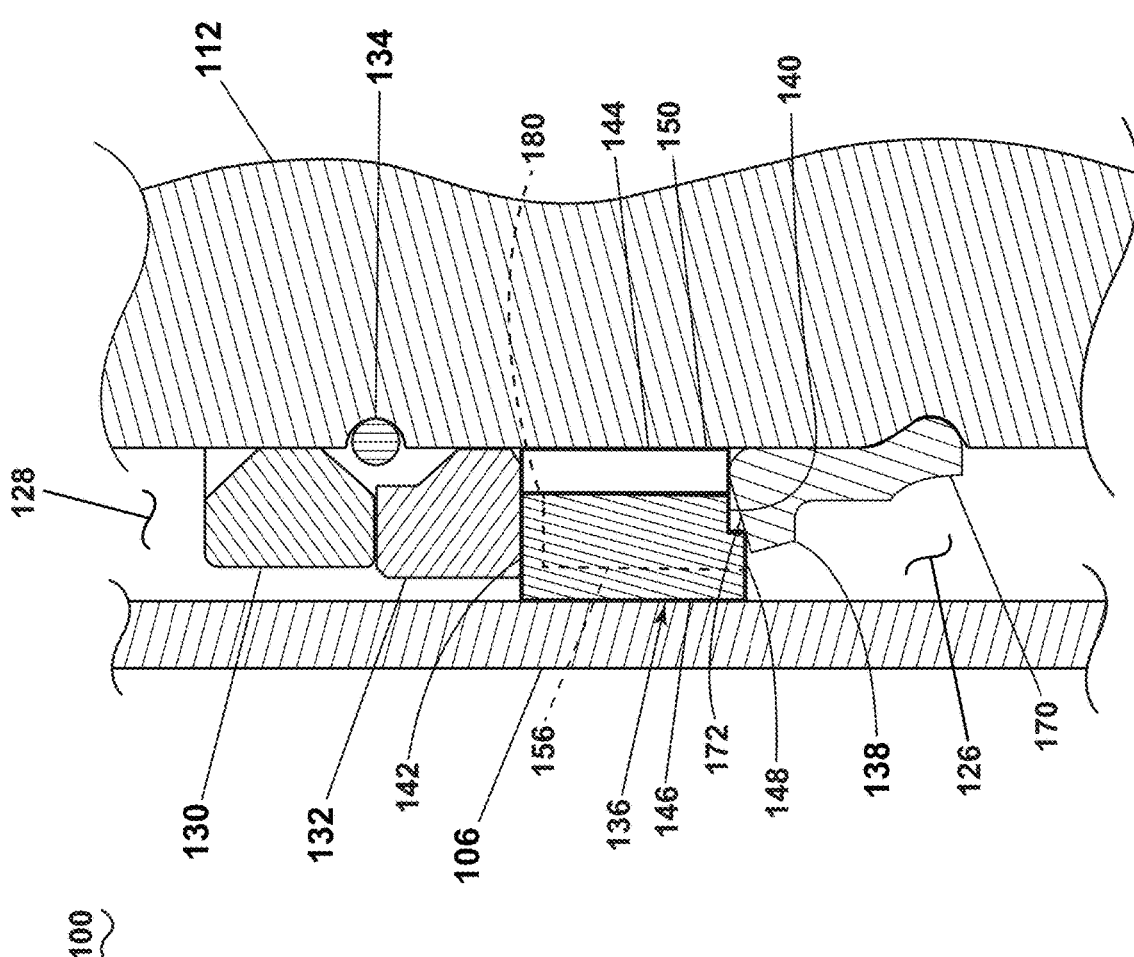

FIG. 3 is a schematic enlarged, cross-sectional view of the hydraulic damper 100 as seen from portion III of the hydraulic damper 100 of FIG. 2. Specifically, FIG. 3 is an enlarged sectional view of the sealing assembly of FIG. 2.

The sealing assembly can include a rebound bumper 130, a first collar 132, a snap ring 136, a ring 136, a second collar 138, or any combination thereof that includes the ring 136. It will be appreciated that the sealing assembly can include any other suitable additional element not listed.

The snap ring 136 can be any suitable material such as, but not limited to, a metallic material. The snap ring 136 can be mounted to or otherwise coupled to the moveable rod 112. As such, the snap ring 136 can move with the movement of the moveable rod 112.

The rebound bumper 130 can embody an annular member made from plastic, a polymer, an elastic material, or a metal which defines a through bore (not shown) through which the moveable rod 112 extends. The rebound bumper 130 can be received within a portion of the second rebound chamber 128. As a non-limiting example, the rebound bumper 130 can be disposed around the moveable rod 112 by a snap fit arrangement. In some examples, the rebound bumper 130 can be compressed when the moveable rod 112 moves towards the first end 108 during the second stroke or when the moveable rod 112 is in a full rebound condition against the rebound bumper 130.

The first collar 132 is disposed around the moveable rod 112 and adjacent to the rebound bumper 130. The first collar 132 and the second collar 138 can each be formed as an annular ring circumscribing a respective portion of the moveable rod 112. The first collar 132 and the second collar 138 can each be made of a plastic, a polymer, or a metal. The first collar 132 and the second collar 138 can include any suitable cross-sectional area. As a non-limiting example, the second collar 138 can include a substantially L-shaped cross-sectional area. The first collar 132 and the second collar 138 can be coupled to the moveable rod through any suitable method such as, but not limited to, adhesion, welding, fastening, crimping, or the like.

The second collar 138 can be mounted to our otherwise coupled to the moveable rod 112. As a non-limiting example, the second collar 138 can be compared to the moveable rod 112 such that the second collar 138 includes a crimp 170. Due to the crimp 170, the second collar 138 can bow inwards or otherwise flex, as illustrated, such that an upper surface 172 of the second collar 138 extends non-perpendicularly to the centerline axis 113.

The ring 136 can be sandwiched or otherwise provided axially between the first collar 132 and the second collar 138, with respect to the centerline axis 113. The ring 136 can include a first wall 140 and a second wall 142, axially opposite the first wall 140. The first wall 140 can contact or otherwise confront the second collar 138, while the second wall 142 can contact or otherwise confront the first collar 132. The ring 136 can include an inner wall 144 and an outer wall 146, radially opposite the inner wall 144. The inner wall 144 can contact or otherwise confront the moveable rod 112, while the outer wall 146 can contact or otherwise confront the pressure tube 106. The ring 136 can include a boss 148 provided along the first wall 140. While shown as directly contacting the moveable rod 112, it will be appreciated that a spacer can be provided between the inner wall 144 and the moveable rod 112. As a non-limiting example, the first collar 132 can be formed such that it extends axially down towards the second collar 138, along the inner wall 144. As such, the first collar 132 can form a spacer provided radially between the inner wall 144 and the moveable rod 112.

The boss 148 can be provided along a portion of the first wall 140 and contact the upper surface 172 of the second collar 138. It will be appreciated, however, that the ring 136 can be flipped such that the boss 148 confronts a lower surface of the first collar 132. In either case, the boss forms a direct contact between the respective collar (e.g., the second collar 138 or the first collar 132).

The ring 136 can include a plurality of channels. As a non-limiting example, the ring 136 can include a set of interior channels 150, a set of exterior channels 156, a set of connecting channels 180, or a combination thereof. The set of interior channels 150 can extend axially along a respective portion of the inner wall 144. The set of exterior channels 156 can extend axially along a respective portion of the outer wall 146. The set of connecting channels 180 can extend radially along a respective portion of the second wall 142. The set of connecting channels 180 can fluidly couple to the set of interior channels 150 and the set of exterior channels 156 or otherwise interconnect a portion of the second wall 142 at the inner wall 144 with a portion of the second wall 142 at the outer wall 146.

Figure 4:
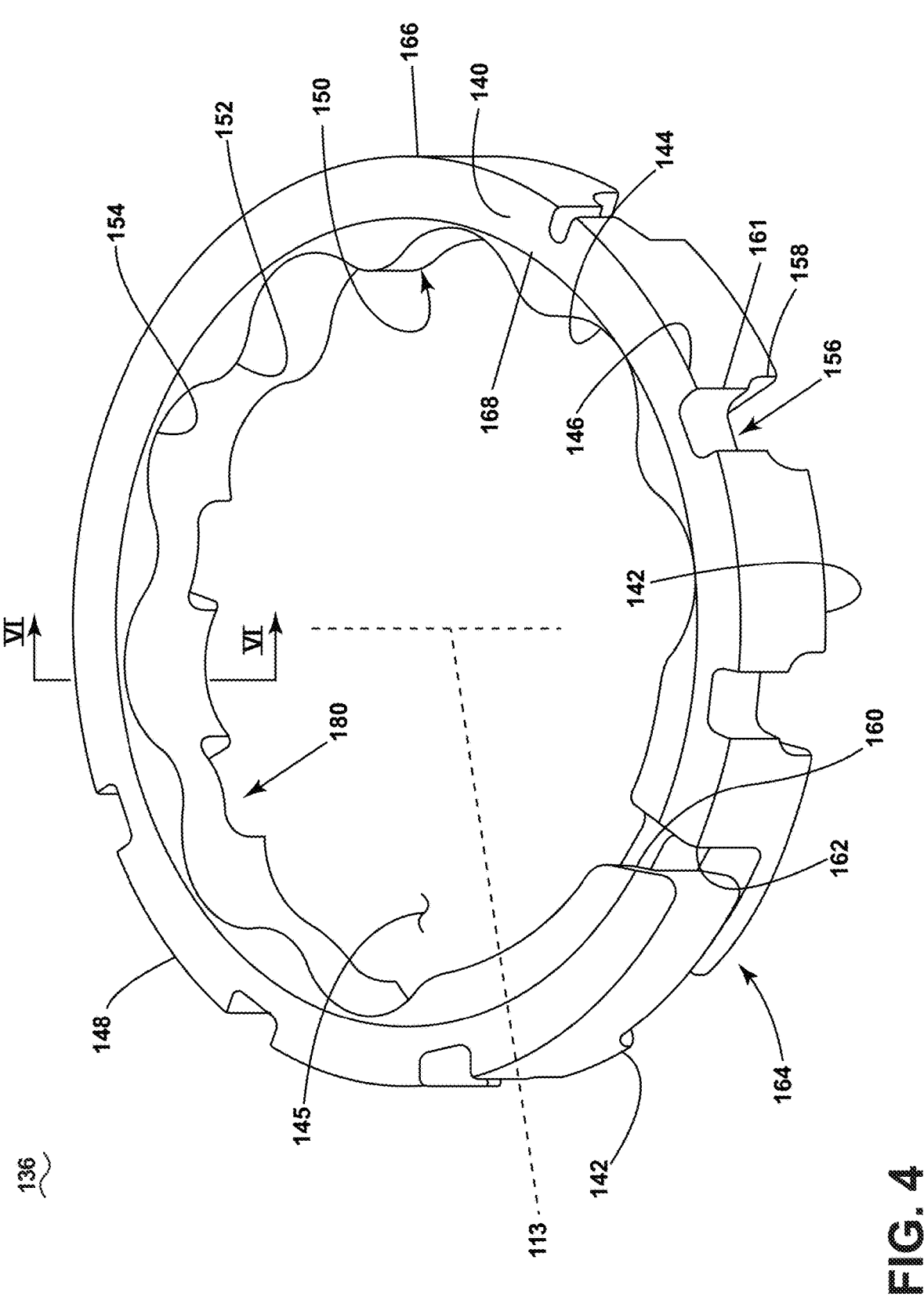
FIG. 4 is a perspective view looking down along the first wall of the ring of FIG. 3, further comprising a boss formed along portion of the first wall.

FIG. 4 is a schematic perspective looking down on the first wall 140 of the ring 136 of FIG. 3. The inner wall 144 defines an annular through-hole 145 through which the moveable rod 112 (FIG. 2) extends through. The ring 136 can include a plurality of channels formed along at least one of the inner wall 144, the outer wall 146, the first wall 140 or the second wall 142.

The set of interior channels 150 can be formed by a series of peaks 152 and valleys 154. The series of peaks 152 and valleys 154 can form a wave formation along the inner wall 144. The peaks 152 can directly contact the moveable rod 112, while the valleys 154 are spaced from the moveable rod 112 to define a channel or gap therebetween. It will be appreciated that the peaks 152 and valleys 154 can have a constant or non-constant amplitude along the inner wall 144 (e.g., a minimum and maximum, respectively, radial distance to the centerline axis 113). It will be appreciated that there can be any number of one or more interior channels of the set of interior channels 150 evenly or non-evenly spaced about the inner wall 144. It will be appreciated that at least one of the set of interior channels 150 can include a respective centerline axis extending form the first wall 140 to the second wall 142 that extends parallel to or non-parallel to the centerline axis 113.

While illustrated as a series of peaks 152 and valleys 154, it will be appreciated that the set of interior channels 150 can take any suitable form or otherwise be defined as any suitable portion or assembly of the ring 136 that allows for a fluid to pass between the inner wall 144 and an opposing portion of the hydraulic damper 100. As a non-limiting example, the set of interior channels 150 can be formed by a series of cutouts or teeth provided along the inner wall 144 such that the set of interior channels 150 form a gear-like cross section. As a non-limiting example, the set of interior channels 150 can be formed by a series of spring tabs that extend from the ring and contact an opposing portion of the hydraulic damper 100.

The set of exterior channels 156 can be spaced evenly or non-evenly about the outer wall 146. The set of exterior channels 156 can include a constant or non-constant cross-sectional area along a plane perpendicular to the centerline axis 113. As a non-limiting example, the set of exterior channels 156 can include a first leg 158 and a second leg 161 having varying cross-sectional areas with respect to one another. The set of exterior channels 156 can be uniformly formed or non-uniformly formed between the set of exterior channels 156. As a non-limiting example, a first exterior channel of the set of exterior channels 156 can include a constant cross-sectional area, while a second exterior channel of the set of exterior channels 156 can include a non-constant or non-equal cross-sectional area. It is contemplated that at least a portion of the exterior channels 156 can extend through the boss 148. It will be appreciated that there can be any number of one or more exterior channels of the set of exterior channels 156 evenly or non-evenly spaced about the outer wall 146. It will be appreciated that at least one of the set of exterior channels 156 can include a respective centerline axis extending form the first wall 140 to the second wall 142 that extends parallel to or non-parallel to the centerline axis 113.

The of connecting channels 180 can be provided along the second wall 142. It is contemplated that at least a portion of the set of connecting channels 180 can correspond to the set of exterior channels 156 or the set of interior channels 150.

In other words, the set of connecting channels can fluidly couple the set of exterior channels 156 to the set of interior channels 150. The set of connecting channels 180 can have a constant or non-constant cross-sectional area when viewed along a circumferential plane intersecting the set of connecting channels 180. It will be appreciated that there can be any number of one or more connecting channels of the set of connecting channels 180 evenly or non-evenly spaced about the second wall 142. It will be appreciated that at least one of the set of connecting channels 180 can include a respective centerline axis extending form the inner wall 144 to the outer wall 146 that extends parallel to or non-parallel to a radial line extending from the centerline axis 113 and intersecting the respective centerline axis.

The first wall 140 of the ring 136 extends circumferentially between a first distal end 160 and a second distal end 162. The first distal end 160 can be spaced from the second distal end 162 such that the first wall 140, the second wall 142, the inner wall 144, and the outer wall 146 do not extend continuously about the centerline axis 113. Alternatively, at least one of the first wall 140, the second wall 142, the inner wall 144, and the outer wall 146 can extend continuously about the centerline axis 113. A lock 164 can be formed at the first distal end 160 and the second distal end 162 to lock the ring into the illustrated annular shape. The lock 164 can be any suitable lock configured to secure the ring 136 as illustrated. As a non-limiting example, the lock 164 can include a set of hooks the interlock with each other. As a non-limiting example, the lock can be a magnetic lock.

The boss 148 extends radially between an outer end 166 and an inner end 168. The inner end 168 is spaced radially inwardly from the outer end 166, with respect to the centerline axis 113. The outer end 166 can be radially spaced from or coincide with the outer wall 146. The inner end 168 can be radially spaced from or coincide with at least a portion of the inner wall 144. As a non-limiting example, the valley 154 of the interior channel 150 can extend to and have an apex at a respective portion of the inner end 168 of the boss 148.

The boss 148 can be integrally formed with or coupled to a respective portion of the ring 136. As a non-limiting example, the boss 148 can be integrally formed with or otherwise machined into the first wall 140. Alternatively, the boss 148 can be separated formed and then coupled to the ring 136 through any suitable method such as, but not limited to, welding, adhesion, bonding, fastening, or the like. The boss 148 can be made of the same or differing material than a material of a remainder of the ring 136. As a non-limiting example, the boss 148 can be made of an elastomeric material or other sealing material, while the remainder of the ring 136 is made from a plastic material.

Figure 5:
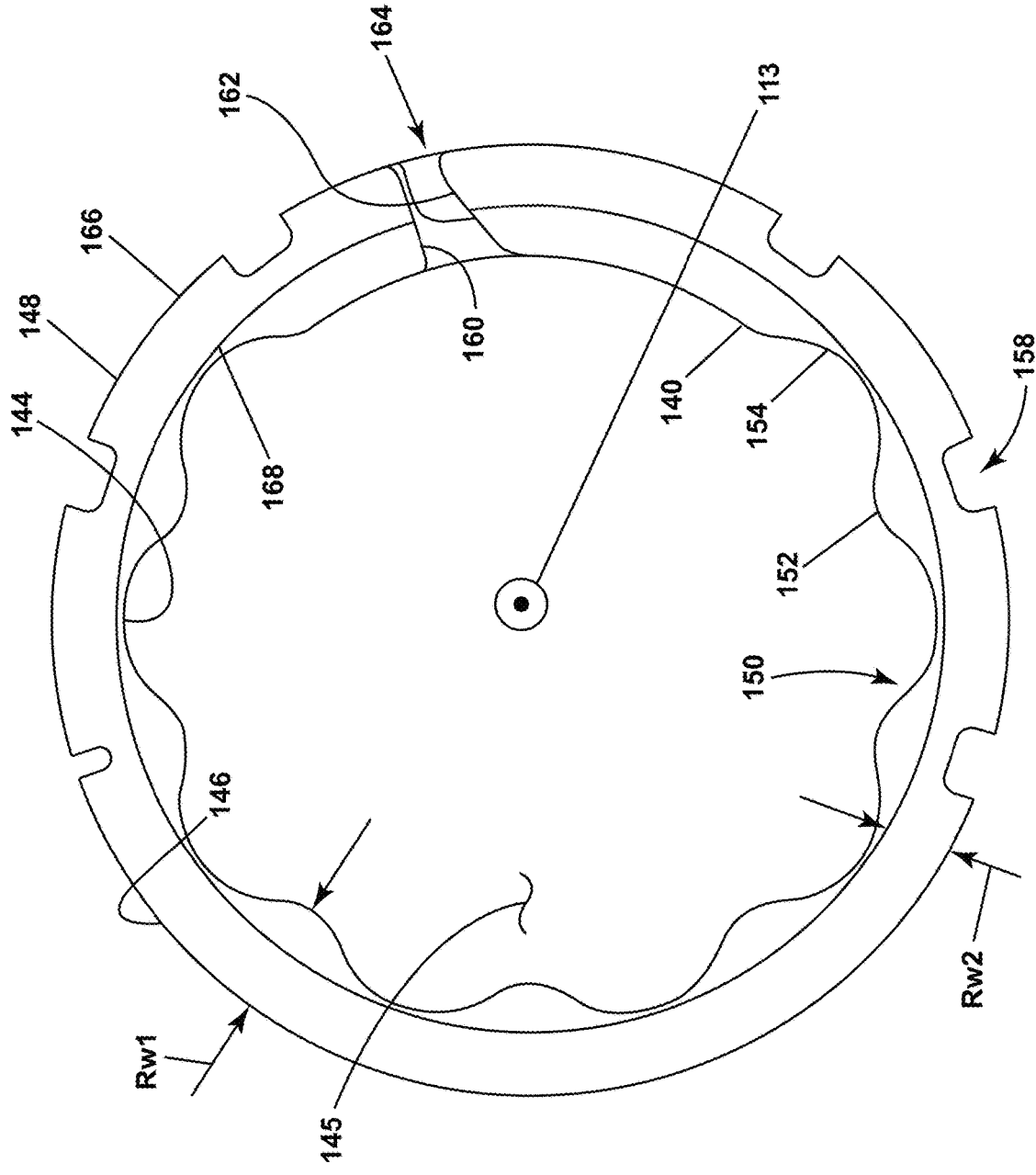
FIG. 5 is a schematic view along the first wall of the ring of FIG. 4, further illustrating a radial thickness of the boss.

FIG. 5 is a schematic view along the first wall 140 of the ring 136 of FIG. 4. The ring 136 extends a first maximum radial width (Rw1) between the inner wall 144 and the outer wall 146, with respect to the centerline axis 113. The boss 148 extends a second maximum radial width (Rw2) between the inner end 168 and the outer end 166, with respect to the centerline axis 113. The first maximum radial width (Rw1) is larger than the second maximum radial width (Rw2). As a non-limiting example, the second maximum radial width (Rw2) can be greater than or equal to 50% and less than 100% of the first maximum radial width (Rw1). As a non-limiting example, the second maximum radial width (Rw2) can be greater than or equal to 80% and less than 100% of the first maximum radial width (Rw1). As a non-limiting example, the second maximum radial width (Rw2) can be greater than or equal to 30% and less than or equal to 70% of the first maximum radial width (Rw1).

Figure 6:
FIG. 6 is a schematic cross-sectional view of the ring as seen from sectional line VI-VI of FIG. 4, further illustrating an axial thickness of the boss.
Figure 6:
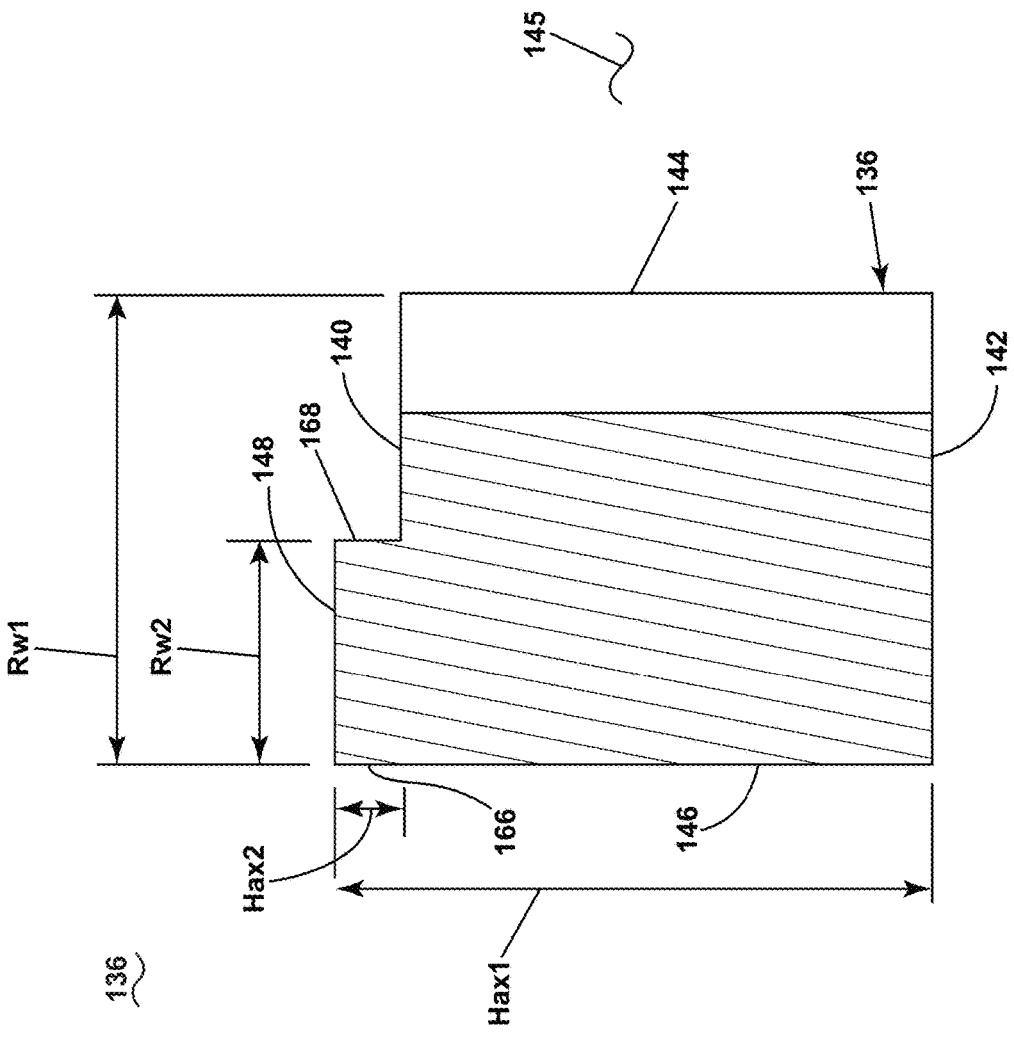

FIG. 6 is a schematic cross-sectional side view of the ring 136 as seen from sectional line VI-VI of FIG. 4. The ring 136 can extend a first maximum axial height (Hax1) between the first wall 140 and the second wall 142, with respect to the centerline axis 113. The boss 148 can extend a second maximum axial height (Hax2) from where the boss 148 extends from the first wall 140 to where the boss 148 axially terminates, with respect to the centerline axis 113. As a non-limiting example, the second maximum axial height (Hax2) can be greater than 0% and less than or equal to 100% of the first maximum axial height (Hax1). As a non-limiting example, the see second maximum axial height (Hax2) can be greater than or equal to 5% and less than or equal to 50% of the first maximum axial height (Hax1). As a non-limiting example, the second maximum axial height (Hax2) can be greater than or equal to 5% and less than or equal to 20% of the first maximum axial height (Hax1).

Figure 7:
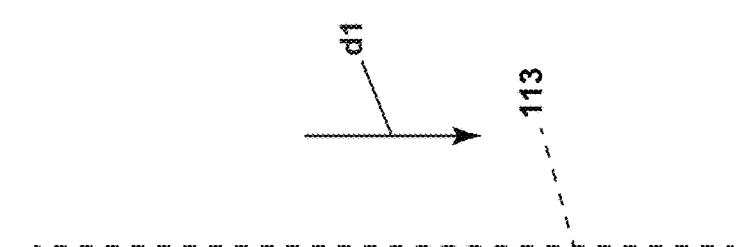
FIG. 7 is a schematic enlarged, cross-sectional view of the sealing assembly as seen from portion III of FIG. 2, further illustrating a fluid flow during a first stroke of the hydraulic damper.
Figure 7:
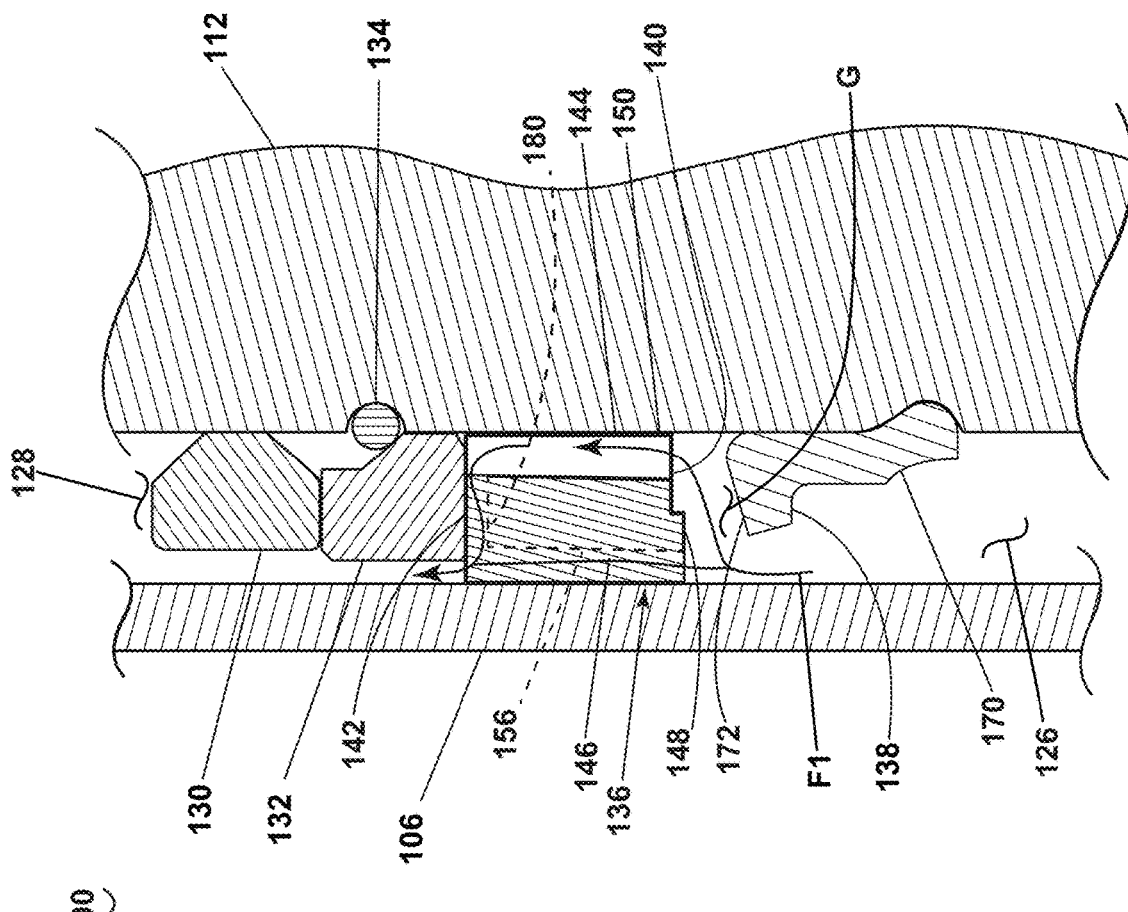

FIG. 7 schematically illustrates the hydraulic damper 100 as seen from section III of FIG. 2 during a first stroke of the hydraulic damper. During the first stroke, the moveable rod 112 moves in a first direction (d1).

Figure 8:
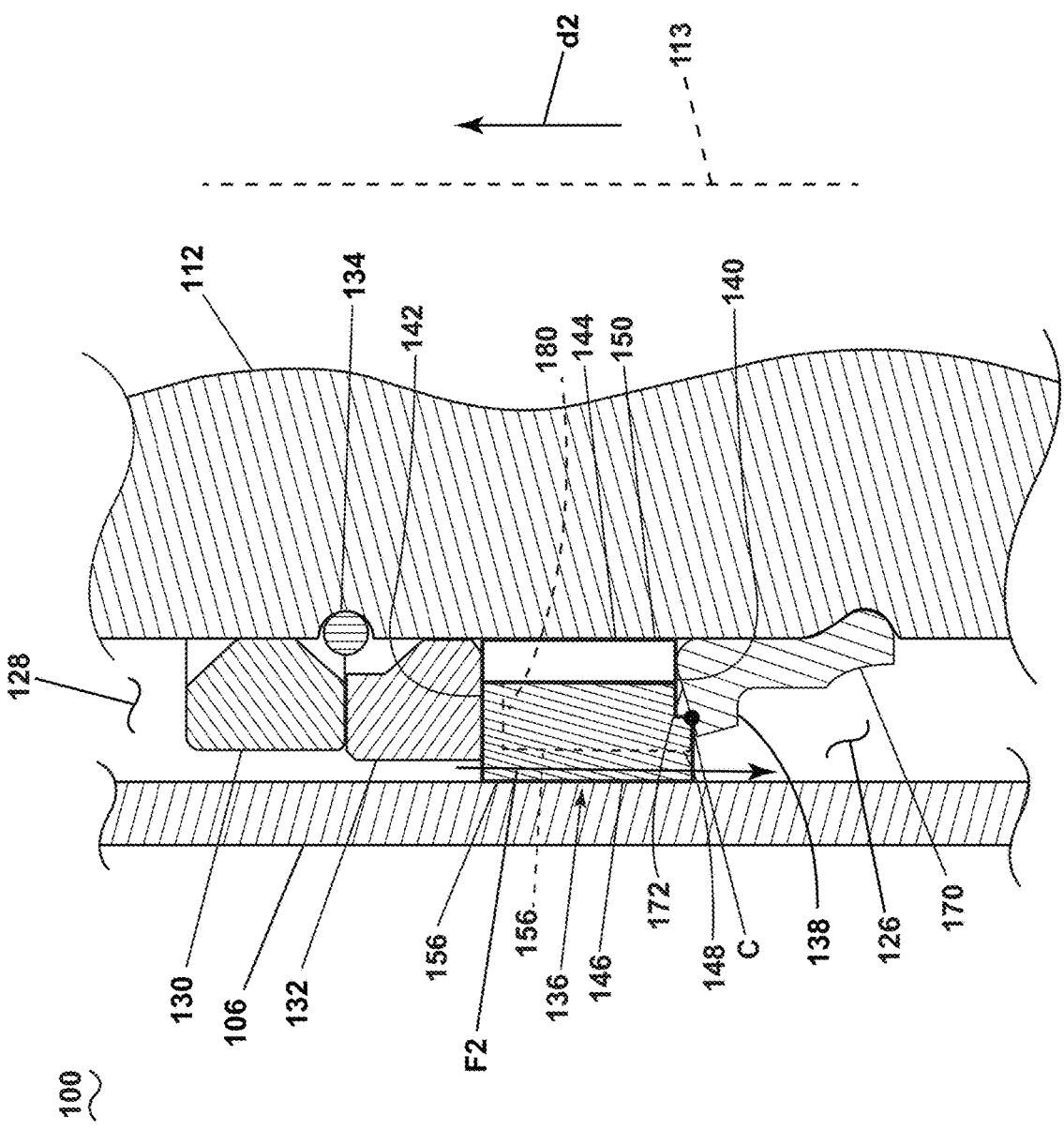
FIG. 8 is a schematic enlarged, cross-sectional view of the sealing assembly as seen from portion III of FIG. 2, further illustrating a fluid flow during a second stroke of the hydraulic damper.

FIG. 8 schematically illustrates the hydraulic damper 100 as seen from section III of FIG. 2 during a second stroke of the hydraulic damper. During the second stroke, the moveable rod 112 moves in a second direction (d2).

With reference to both FIGS. 7 and 8, during operation of the hydraulic damper 100, the moveable rod 112 will move between the first stroke (FIG. 7) and the second stroke (FIG. 8).

During the first stroke (FIG. 7), a hydraulic fluid from the first rebound chamber 126 is compressed and forced to flow into or otherwise replenish an area of lower pressure (e.g., the second rebound chamber 128) via a first fluid flow (F1). As such, the movement of the moveable rod 112 in the first direction (d1) can further be defined as the movement of the moveable rod 112 in a replenishment direction to replenish or otherwise fill the low-pressure area with hydraulic fluid. During movement of the moveable rod 112 in the first direction (d1), portions of the sealing assembly coupled to the moveable rod, specifically the snap ring 136 and the second collar 138 will move with the moveable rod 112. The first fluid flow (F1) is counter this movement and imparts a force on a portion of the sealing assembly such that the portion of the sealing assembly not coupled to the moveable rod 112, specifically the ring 136, the first collar 134 and the rebound bumper 130 will not move with the moveable rod 112. As such, a gap (G) will form between the ring 136 and the second collar 138. The snap ring 136 defines a stop or otherwise an axial extreme for how far the first collar 134 and the ring 136 will move. The gap (G) allows for the first fluid flow (F1) to flow through the ring 136, specifically through the set of interior channels 150, the set of exterior channels 156, and the set of connecting channels 180 and ultimately to the second rebound chamber 128.

During the second stroke (FIG. 8), however, the moveable rod 112 moves in the second direction (d2). During the second stroke, the hydraulic fluid from the second rebound chamber 128 is compressed and forced to flow to an area of lower pressure (e.g., the first rebound chamber 126) as a second fluid flow (F2). The force of the second fluid flow (F2) and the movement of the snap ring 136 and the second collar 138 with the moveable rod 112 causes the gap (G) to close during the second stroke. When the gap (G) is closed, at least a portion of the ring 136 contacts the upper surface 172 of the second collar 138. As a non-limiting example, a portion of the boss 148, specifically the inner end 168 (FIG. 4) of the boss 148, contacts the second collar 138 at a contact point (C). This contact point (C) creates a fluid-tight seal such that the second fluid flow (F2) cannot flow through the set of connecting channels 180 and the set of interior channels 150 and through a space between the ring 136 and the second collar 138. In other words, the contact point (C) ensures that a leakage fluid cannot flow between the ring 136 and the second collar 138 and instead flows entirely through the set of exterior channels 156. As such, the movement of the moveable rod 112 in the second direction (d2) can be defined as the movement of the moveable rod 112 in a sealing direction. It will be appreciated that the boss 148 is sized through the second maximum axial height (Hax2) and the second maximum radial width (Rw2) such that the contact point (C) is always provide along a portion of the boss 148.

The boss 148 is used to create a seal between the ring 136 and a confronting collar (e.g., the second collar 138). The seal may be fluid-tight, meaning that it at least significantly reduces the flow of fluid therethrough to no more than a negligible or nominal volume. This fluid-tight seal, in turn, ensures that a fluid, hereinafter referred to as a leakage fluid, does not flow between the boss 148 and the opposing collar when the moveable rod 112 moves in the sealing direction (FIG. 8); specifically through the set of interior channels 150. The prevention of the leakage fluid reduces the total area available for the second fluid flow (F2) to flow through. As such, the second fluid flow (F2) must flow through the set of exterior channels 156 in order to flow from the second rebound chamber 128 to the first rebound chamber 126. This reduction of the area and the forced flow of the second fluid flow (F2) through the set of exterior channels 156 rather than through the set of exterior channels 156 and the set of interior channels 150, ensures that the pressure drop of the second fluid flow (F2) between the second wall 142 and the first wall 140 is adequate to provide the desired damping force of the hydraulic damper 100.

It is contemplated that the boss 148 can further be used to minimize part-to-part variation that can occur during the manufacturing process of the hydraulic damper 100. As used herein, the term "part-to-part variation" refers to a difference between assemblies of a same construction. In the case of the hydraulic damper 100, the second collar 138 is crimped at the crimp 170 (FIG. 3), which causes the upper surface 172 of the second collar 138 to bend, as illustrated. It is contemplated that the angling of the upper surface 172 can vary between parts due to the crimp 170. This variation between the angling of the upper surface 172 can create a part-to-part variation between two hydraulic dampers including the second collar 138. It is contemplated that the ring 136 including the boss 148 can eliminate any drawback to the part-to-part variation between hydraulic dampers 100 due to the angling of the upper surface 172. Specifically, the boss 148 can be positioned and sized such that the ring 136 can form the contact point (C) between the boss 148 and the upper surface 172 for a wide range of anglings of the upper surface 172.

It is contemplated that the drawbacks of having varying anglings of the second collar 138 can include a decreased sealing efficiency between the ring 136 and the second collar 138. For example, if the ring 136 is formed without the boss 148, the contact point (C) between the ring 136 and the second collar 138 will move based on the angling of the upper surface 172. In some cases, it is contemplated that the angling of the upper surface 172 could be large enough such that the contact point (C) would be radially closer to the moveable rod 112 such that a leakage fluid could flow through the set of interior channels 150 and between the ring 136 and the second collar 138. The boss 148, however, ensures that the contact point (C) will always be created between the boss 148 and the second collar 138, thus eliminating any chance of the leakage fluid being created even when part-to-part variation is considered.

Benefits of the present disclosure include a sealing assembly with an increased sealing efficiency when compared to a conventional sealing assembly in a conventional hydraulic damper. For example, the conventional sealing assembly can include a ring without the boss as described herein. As such, during the second stroke, at least a portion of the hydraulic fluid can flow between the ring and the moveable rod as a leakage fluid. The hydraulic damper, as described herein, includes a sealing assembly with the ring having the boss. The boss, as discussed herein, creates a fluid-tight seal between the ring and the opposing collar that ultimately eliminates the formation of the leakage fluid when the moveable rod moves in the sealing direction. This elimination of the leakage fluid, in turn increases the pressure drop between the second wall and the first wall of the ring, when compared to the conventional ring, which ultimately increases the damping force or efficiency of the hydraulic damper when compared to the conventional hydraulic damper.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydraulic damper comprising:
   a moveable rod having a centerline axis;
   a collar circumscribing and coupled to the moveable rod; and
   a ring axially adjacent the collar, the ring comprising:
      an inner wall extending circumferentially about the centerline axis and circumscribing the moveable rod;
      an outer wall extending circumferentially about the centerline axis, the outer wall circumscribing the inner wall;
      a first wall interconnecting the inner wall and the outer wall at a first end of the ring, the first wall being axially adjacent the collar;
      a second wall, axially spaced from the first wall, interconnecting the inner wall and the outer wall at a second end, axially opposing the first end, of the ring; and a boss provided along a portion of the first wall and defining a raised portion of the first wall, the boss terminating prior to the inner wall, the boss forming a contact point defining a fluid-tight seal with the collar during a first stroke of the hydraulic damper.

2. The hydraulic damper of claim 1, wherein the boss extends radially between an inner end and an outer end, with the inner end defining the contact point.

3. The hydraulic damper of claim 2, wherein the inner end extends continuously, circumferentially about the centerline axis between circumferentially distal ends of the first wall.

4. The hydraulic damper of claim 1, wherein a gap is formed between the boss and the collar during a second stroke, opposing the first stroke, of the hydraulic damper.

5. The hydraulic damper of claim 1, wherein the boss extends radially inwardly from the outer wall and towards the inner wall.

6. The hydraulic damper of claim 5, wherein the boss terminates radially prior to the inner wall.

7. The hydraulic damper of claim 1, wherein the ring further comprises a set of exterior channels extending axially along the outer wall between the first wall and the second wall.

8. The hydraulic damper of claim 7, wherein each exterior channel of the set of exterior channels includes a cross-sectional area when viewed along a plane perpendicular to the centerline axis, the cross-sectional area being non-constant from the first wall to the second wall.

9. The hydraulic damper of claim 7, wherein the set of exterior channels extend through the boss.

10. The hydraulic damper of claim 1, wherein the ring further comprises a set of interior channels extending axially along the inner wall between the first wall and the second wall.

11. The hydraulic damper of claim 10, wherein the set of interior channels include a series of peaks and valleys.

12. The hydraulic damper of claim 11, wherein the boss terminates radially prior to the valleys.

13. The hydraulic damper of claim 1, wherein the ring further comprises a set of connecting channels extending radially along the second wall between the inner wall and the outer wall.

14. The hydraulic damper of claim 1, wherein the first wall includes a first distal end and a second distal end, with the boss extending continuously between the first distal end and the second distal end.

15. The hydraulic damper of claim 1, further comprising a spacer provided radially between the inner wall and the moveable rod.

16. A ring for a hydraulic damper having a moveable rod having a centerline axis, the ring comprising:

an inner wall extending circumferentially about the centerline axis and circumscribing the moveable rod;

an outer wall extending circumferentially about the centerline axis, the outer wall circumscribing the inner wall;

a first wall interconnecting the inner wall and the outer wall at a first end of the ring;

a second wall, axially spaced from the first wall, interconnecting the inner wall and the outer wall at a second end, axially opposing the first end, of the ring; and a boss provided along a portion of the first wall and defining a raised portion of the first wall, the boss terminating prior to the inner wall, the boss positioned and shaped to form a contact point defining a fluid-restricting seal with a corresponding portion of the hydraulic damper during a first stroke of the hydraulic damper.

17. The ring of claim 16, wherein the boss extends radially inwardly from the outer wall and towards the inner wall.

18. The ring of claim 17, wherein the boss terminates radially prior to the inner wall.

19. The ring of claim 16, wherein the first wall includes a first distal end and a second distal end, with the boss extending continuously between the first distal end and the second distal end.

20. The ring of claim 16, further comprising a set of interior channels defined by a series of peaks and valleys, with the ring terminating radially prior to the valleys.

* * * * *